A. G. WILLIAMS.
JOINT COVER.
APPLICATION FILED APR. 29, 1908.
946,183.
Patented Jan. 11, 1910.
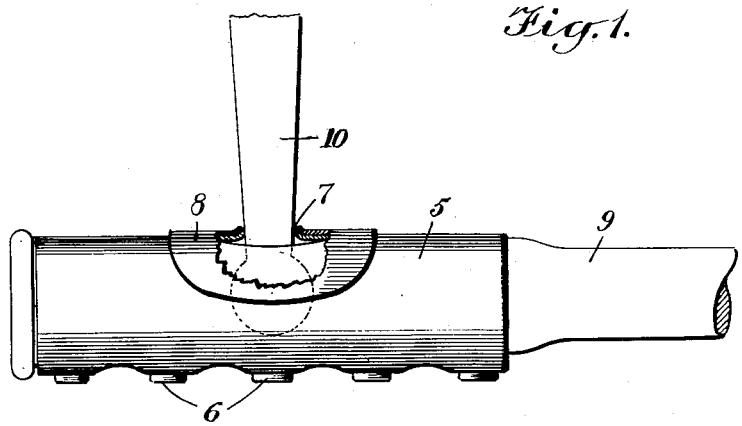
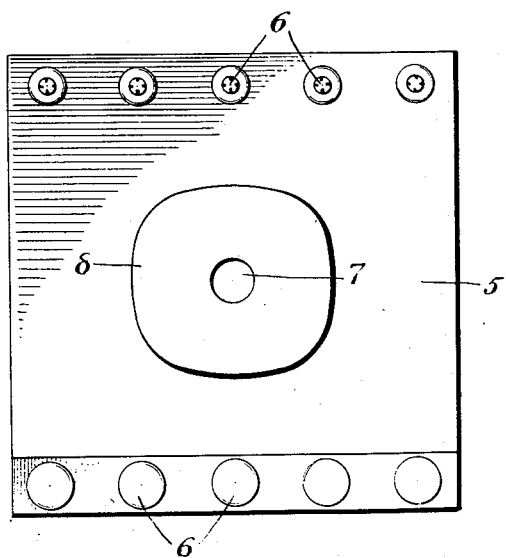
WITNESSES
INVENTOR
Arthur George Williams
BY
ATTORNEYS

UNITED STATES PATENT OFFICE.

ARTHUR GEORGE WILLIAMS, OF SIDNEY, NEW YORK.

JOINT-COVER.

946,183.  Specification of Letters Patent.  Patented Jan. 11, 1910.

Application filed April 29, 1908. Serial No. 429,869.

*To all whom it may concern:*

Be it known that I, ARTHUR GEORGE WILLIAMS, a citizen of the United States, and a resident of Sidney, in the county of Delaware and State of New York, have invented a new and Improved Joint-Cover, of which the following is a full, clear, and exact description.

This invention is an improvement in joint covers, more especially designed for excluding the dust, etc. from ball and socket joints of the character used in the steering mechanism of motor vehicles.

The invention has for its purpose the provision of a sleeve of flexible material, as rubber, adapted to be opened out in the form of a flat sheet and be detachably connected about a shaft, as, for example, the drag link on the vehicle steering mechanism, the sleeve being provided with an opening in its side adapted to be expanded over the ball carried by the arm of said mechanism, or other equivalent part, and closely fit around the arm, whereby the joint between the link and arm is protected without interfering with the relative movement between these parts.

Reference is to be had to the accompanying drawings forming a part of this specification, in which similar characters of reference indicate corresponding parts in both views.

Figure 1 is a view of the connection between the drag link and arm of the steering mechanism of a motor vehicle with my improved joint cover applied thereto, the cover being shown partly broken away to better illustrate the construction; and Fig. 2 is a plan of the cover when the sleeve which it forms is opened out.

The cover is constructed in the form of a sleeve 5 of flexible material, preferably of an elastic nature, such as rubber, and is detachably connected along the side in order that it may be easily applied and removed as when opened out in the form of a flat sheet, as illustrated in Fig. 2. The means for detachably connecting the edges of the cover to form the sleeve I have shown to be in the nature of ball and socket buttons 6, although I recognize that there are other means by which this connection might be satisfactorily made, as, for example, by lacing etc. In the cover, preferably at its center, is formed an opening 7, of a size depending on the character of the joint. The cover is reinforced around this opening by an additional layer 8 of the same material as the cover, or some other material suitable for this purpose.

In Fig. 1 I have shown the cover applied at the connection of the drag link 9 and the arm 10 of the steering mechanism of a motor vehicle, in which relation it is more especially designed for use. In applying the cover to these parts the ball of the arm is removed from the link and is forced through the opening 7 in the side of the cover, the material being sufficiently elastic to permit of this expansion of the opening and to closely fit around the arm after the ball has passed through. The arm and link are then connected and the cover drawn around the link and buttoned to form the sleeve, which is of such diameter as to provide a snug fit. With the cover thus applied, the joint between the link and arm is protected from the dust, etc. without in any wise interfering with the relative movement between these parts. Instead of making the cover wholly of an elastic material, as rubber, the same might be constructed of leather, canvas, or any other similar material of a flexible nature, and a piece such as the piece 8, of an elastic material, secured about the opening in order that the opening might expand sufficiently to let the ball of the joint pass through it. It is, however, preferable to construct the cover wholly of rubber in order that a tighter and better fit may be had about the drag link or other shaft around which it is placed.

Having thus described my invention, I claim as new and desire to secure by Letters Patent:

A cover for protecting a ball joint, comprising a flexible sleeve adapted to be opened out in the form of a flat sheet and provided with an opening in its side, with the edges or walls of said opening formed of an elastic material and adapted to be expanded over the ball of the joint and closely fit around the member to which the ball is secured.

In testimony whereof I have signed my name to this specification in the presence of two subscribing witnesses.

ARTHUR GEORGE WILLIAMS.

Witnesses:
 HELEN A. C. SHERWOOD,
 HARRIET W. THORP.